Figures 1, 4:
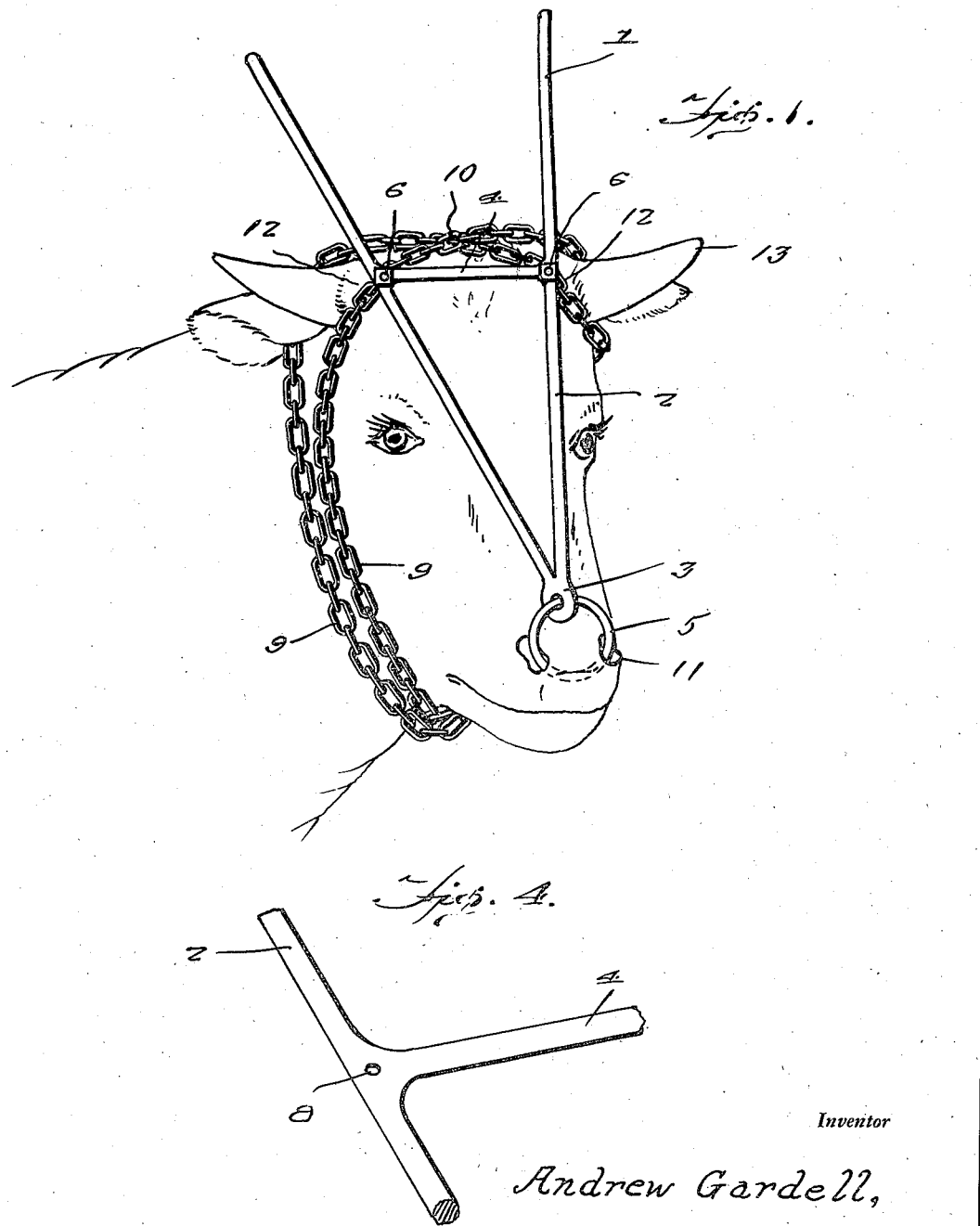

Aug. 28, 1945.  A. GARDELL  2,383,718
ANIMAL POKE
Filed April 20, 1944  2 Sheets-Sheet 1

Inventor
Andrew Gardell,
By Clarence A. O'Brien
and Harvey B. Jacobson
Attorneys

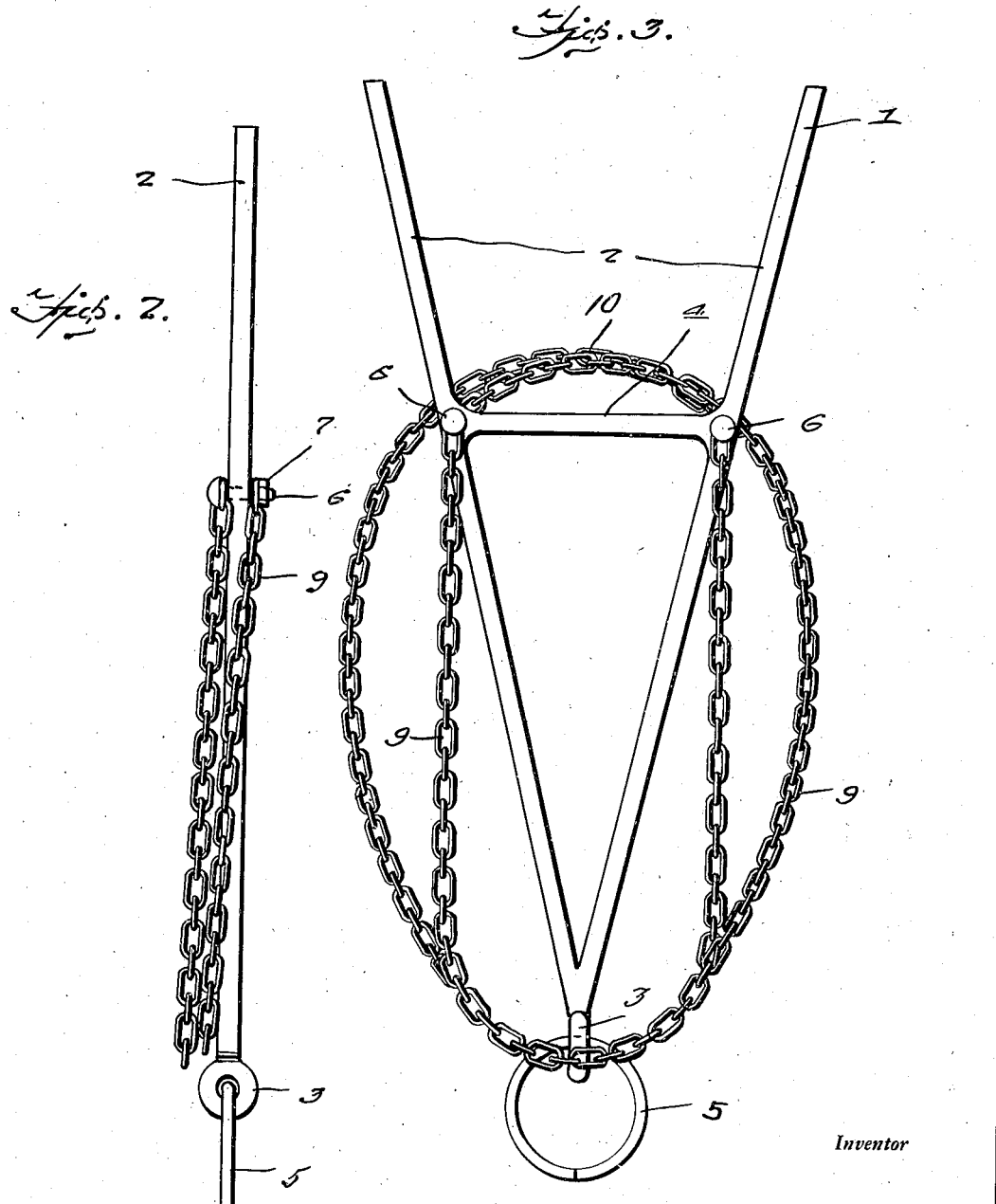

Patented Aug. 28, 1945

2,383,718

UNITED STATES PATENT OFFICE 2,383,718

ANIMAL POKE

Andrew Gardell, Ellensburg, Wash.

Application April 20, 1944, Serial No. 531,910

1 Claim. (Cl. 119—136)

My invention relates to improvements in animal pokes, for bulls, more particularly, the principal object in view being to provide a practical, easily applied poke of simple, inexpensive construction especially designed to restrain vicious bulls from goring people, or animals, butting the same, or inanimate objects, or pushing through fences, to the end that loss of life and injuries to property and persons caused by vicious bulls may be prevented, also incidental injuries to valuable bulls caused by their attempts to push through barbed wire and other enclosures, and to butt stalls and other objects.

Other and subordinate objects are also comprehended by my invention, all of which, together with the precise nature of my improvements, will be readily understood when the succeeding description and claim are read with reference to the drawings accompanying and forming part of this specification.

In said drawings:

Figure 1 is a view in perspective of my improved poke, in its preferred embodiment, applied, Figure 2 is a view in side elevation of the poke detached and drawn to an enlarged scale, Figure 3 is a view in rear elevation, Figure 4 is a fragmentary view in perspective of one of the side bars and the cross bar, and illustrating the location of the bolt holes.

Referring to the drawings by numerals, my improved poke, as shown, comprises a rod-like frame 1 of inverted A shape comprising a pair of side bars 2, which, when the poke is applied, diverge upwardly from a lower end eye 3, and a cross bar 4 intermediate the eye 3 and the free ends of said bars 2. The usual nose ring 5 is passed through the eye 3. A pair of bolts 6, with nuts 7 thereon, are extended through bolt holes, as at 8, provided in the side bars 2 at the juncture of the cross bar 4 with said side bars 2. A pair of chains 9 are suitably anchored at one end on the bolts 6 on the rear side of the frame 1.

In applying the described poke, the nose ring 5 is inserted in the nostrils 11 of the animal, in the usual manner, with the frame 1 extended upwardly of the animal's face. In this connection, it is to be noted that the side bars 2 are designed to lie against the root areas 12 of the horns 13 in front thereof, and the bolts 6 and the cross bar 4 are horizontally aligned with said root areas 12. This arrangement of the side bars 1, bolts 6 and chains 9 provides for securely applying the frame 1 by looping the pair of chains 9 downwardly around opposite sides of the neck of the animal with the pair crossed, as at 10, over the root area of the horns and then extending said pair upwardly around opposite sides of the neck and attaching their free ends to bolts 6 at the sides of the frame opposite the sides to which the anchored ends are attached. The specified arrangement of the cross bars 4 provides for bracing the side bars 2 where such bracing is obviously most required. The chain 9 may be adjusted on bolts 6 to suit requirements by attaching different end links of the chains to said bolts. As best illustrated in Figure 1, the side bars 2 extend well above the head of the animal.

The manner in which the invention functions will be readily understood. If the animal attempts to charge or butt, and thereby lowers his head, impact against the side bars 2 above the animal's head will cause the frame to fulcrum on the root areas 12 of the horns 13 so that the eye 3 will pull or tug on the ring 5 and the latter will inflict severe pain in the nostril regions. This will, for reasons well known, cause the animal to refrain from charging or butting. If the animal should hook the upper ends of the side bars 2 under an object so that downward pressure might be exerted on the side bars, the nose ring 5 would be swung in the nostrils 11 to cause severe pain and the rear chain loop tightened around the animal's neck. The result as regards causing the animal to refrain from his endeavors would be the same.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A poke for a horned animal comprising a pair of upwardly diverging side bars adapted to extend upwardly over the face of the animal and above the head of the same and having joined lower ends, means to connect said ends to the nostrils of the animal comprising a nose ring on which said ends are swiveled, and means to anchor said bars intermediate the ends thereof to the head and neck of the animal comprising a pair of chain loops extending around said neck and crossed over the animal's head, a cross bar extending between said side bars and adapted to lie against the forehead of the animal, and a pair of bolts extending through said side bars at the junctures of the cross bar therewith, said chain loops each having ends anchored to the bolts of said pair.

ANDREW GARDELL.